United States Patent [19]

Altemir

[11] Patent Number: 5,684,276
[45] Date of Patent: Nov. 4, 1997

[54] MICROMECHANICAL OSCILLATING MASS BALANCE

[75] Inventor: David A. Altemir, Houston, Tex.

[73] Assignee: The United States of America as represented by the Administrator of the National Aeronautics and Space Administration, Washington, D.C.

[21] Appl. No.: 587,762

[22] Filed: Dec. 12, 1995

[51] Int. Cl.$^6$ .................................................. G01G 3/14
[52] U.S. Cl. .................................................. 177/210 FP
[58] Field of Search ........................... 177/210 FP, 50; 73/24.01, 24.06, 31.05, 31.06, 61.49, 64.53; 364/571.01, 571.02

[56] References Cited

U.S. PATENT DOCUMENTS

| | | | |
|---|---|---|---|
| 3,492,858 | 2/1970 | Heflinger et al. | 73/67.2 |
| 3,926,271 | 12/1975 | Patashnick | 177/210 |
| 4,294,105 | 10/1981 | Kelly | 73/28 |
| 4,418,774 | 12/1983 | Whitney et al. | 77/210 FP |
| 4,429,574 | 2/1984 | Barry et al. | 73/580 |
| 4,618,014 | 10/1986 | Kobayashi | 177/210 FP |

OTHER PUBLICATIONS

"Process of Creep and Fatigue in Metals" (1962). A. J. Kennedy.
"Resonant–Microbridge Vapor Sensor," Roger T. Howe & Richard S. Muller, IEEE Transactions on Electron Devices, vol. ED–33, #4, pp. 499–506, Apr. 1986.

Primary Examiner—Michael L. Gellner
Assistant Examiner—Randy W. Gibson
Attorney, Agent, or Firm—James M. Cate

[57] ABSTRACT

A micromechanical oscillating mass balance and method adapted for measuring minute quantities of material deposited at a selected location, such as during a vapor deposition process. The invention comprises a vibratory composite beam which includes a dielectric layer sandwiched between two conductive layers. The beam is positioned in a magnetic field. An alternating current passes through one conductive layers, the beam oscillates, inducing an output current in the second conductive layer, which is analyzed to determine the resonant frequency of the beam. As material is deposited on the beam, the mass of the beam increases and the resonant frequency of the beam shifts, and the mass added is determined.

32 Claims, 6 Drawing Sheets

MICROMECHANICAL OSCILLATING MASS BALANCE

ORIGIN OF THE INVENTION

The invention described herein was made by employee(s) of the United States Government and may be manufactured and used by or for the Government of the United States of America for governmental purposes without the payment of any royalties thereon or therefor.

BACKGROUND OF THE INVENTION

The present invention relates to mass measuring processes and apparatus, and more particularly, to mass sensing devices capable of real-time measurement of the minute quantities of material deposited on the surface of a test sample prior to deposition forming of semiconductor chips or the like, by means of signals conducted to sensing and evaluation circuitry positioned external to the deposition chamber. Sensor arrays built up from many such mass sensing devices permit real-time sensing of deposition patterns over the surface of such an array.

Over the past four decades, techniques have been developed for measuring small masses by depositing the mass on the surface of a quartz crystal oscillator and noting the resulting decrease in the frequency of the crystal. These devices are commonly referred to as quartz crystal microbalances ("QCM"s) and comprise a thin quartz crystal sandwiched between two metal electrodes. When an alternating electric field is applied across the piezoelectric quartz crystal, a shear-induced acoustic wave is generated whose frequency is sensitive to changes in mass. This enables small masses to be quantified with a sensitivity on the order of $10^{-9}$ grams/cm$^2$ per Hertz frequency shift.

Typical QCM elements have areas in the neighborhood of 1 cm$^2$ with exaltation frequencies on the order of $10^7$ Hz. However, QCM instrument packages are commercially available that are as small as a person's thumb. Although QCMs are capable of measuring extremely small quantities of matter and are very portable, some disadvantages of this existing technology include its susceptibility to thermal gradient and mass gradient-induced errors. Therefore, corrections must be applied to QCM data whenever the devices are unevenly heated or mass is non-uniformly deposited on active QCM surfaces.

Other kinds of devices currently exist that are also capable of measuring small masses. One of these devices has been developed more recently and is known as a tapered element oscillating microbalance ("TEOM"). Although this instrument also interprets a mass change as a function of a frequency shift, important differences exist between QCMs and TEOMs. Whereas QCMs measure small amounts of matter deposited on a surface, the TEOM is primarily intended to measure the concentration of solid particles in a sampled gas stream. Also, in contrast with QCM which relies on a piezoelectric effect to generate its vibratory motion, the TEOM is driven electromagnetically. In the basic TEOM embodiment, a gas is pumped through the end of the hollow tapered element at a known flow rate. Solid particles are then removed from the gas flow by a filter and the subsequent mass change results in a frequency shift.

Like QCMs, TEOMs are not without problems. The oscillation of the tapered element in TEOMs is controlled by applying an alternating voltage bias to the body of the tapered element. The rate at which this voltage alternates, and hence the rate at which the TEOM vibrates, is controlled by a feedback circuit employing an LED/phototransistor combination that produces an AC voltage based on the motion of the tapered element. Therefore the signal produced by the phototransistor serves as a drive voltage which self-adjusts to alternate at the resonant frequency of the tapered element. The frequency of this TEOM signal can be directly related to the mass accumulated at the free end of the device.

The sensitivity of commercially available TEOMs is on the order of $10^{-6}$ grams. However specialized TEOMs, such as those specially developed for NASA/Goddard Space Flight Center, have been operated with resolutions on the order of $10^{-12}$ grams under extremely well controlled conditions.

With regard to the fabrication of micromechanical devices, micromachining has been extensively practiced in the electronics industry using electron, ion, and X-ray bombardment. These techniques have been used in the fabrication of structures as small as a fraction of a micron long with diameters below 100 angstroms. Tiny vibrating bridges have also been constructed as a tool for fundamental research. These bridges however, do not oscillate under the influence of a controlled electric field nor do they generate an electrical signal.

U.S. Pat. No. 3,492,858 to Heflinger, et al. discloses a microbalance apparatus with a vibratory Elinvar reed located over a vibratory main frame, which is caused to vibrate by a signal applied to a bimorph crystal. A small pickoff coil senses the frequency of vibration of the Elinvar reed and feeds it back through a closed loop circuit causing the driver, frame, and reed to vibrate at the resonant frequency of the reed. Placement of a small mass or particle on the end of the reed alters the reed's resonant frequency according to the mass of the particle, permitting the mass of the particle to be determined. In the Heflinger system, the vibration of the reed is caused by a crystal driver which is not directly coupled to the frame. The Heflinger system however, is not suitable for integration to a silicon chip carrier, and is susceptible to thermal errors.

U.S. Pat. No. 3,926,271, to Pataschnick, discloses a microbalance which implements a thin walled quartz tube that has a tapered vibrating section. The vibrating section is preferably a hollow tube, but may alternatively comprise a solid rod. The tube is anchored at one end to a base, and at the distal end it is free to oscillate. The tapered element is driven by alternating fields generated by reaction between alternating currents passed through leads and a field generated by the potential between two electrodes. The vibrating section preferentially vibrates at a given resonant frequency. However, deposits on a substrate mounted on the distal end of the reed change the resonant frequency. This change in frequency is measured by electrical feedback as the frequency of the applied voltage is tuned, or by a motion detector utilizing an optical transducer and light source. The Pataschnick microbalance is of relatively large size and is quite fragile, and would be unacceptable for applications with high inertial loads.

U.S. Pat. No. 4,429,574, to Barry discloses a mass measuring system which determines the mass of relatively larger objects by utilizing a vibrator for inducing vibration within a test object. A probe is connected to piezoelectric transducers for sensing changes in the resonant frequency of vibration and determining differences in mass of the object by evaluating such changes. The Barry mass measuring system is likewise inapplicable to high inertial loads and integration to a silicon chip carrier, due to its size and fragility. Further, the analysis of the Barry system performance requires solution of a series of relatively complex mathematical equations.

Thus, previously available microbalances all suffer from one or more disadvantages, including high cost, poor sensitivity, susceptibility to thermal errors, and lack of durability. The present invention overcomes the deficiencies of the prior art.

SUMMARY OF THE INVENTION

Accordingly, there is provided herein a micromechanical oscillating mass balance and method which are particularly adapted to be used for measuring minute quantities of material deposited at a selected location, such as on a workpiece within an evacuated chamber during a vapor deposition process. The micromechanical oscillating mass balance of the present invention comprises a vibratory composite beam which includes a dielectric layer sandwiched between two conductive layers. The vibratory composite beam is positioned in a magnetic field. An alternating current is passed through one of the conductive layers, whereby the alternating current interacts with the magnetic field and creates a force which deflects and vibrates the beam. As material is deposited on the beam, the mass of the beam increases and the resonant frequency of the beam shifts. An output current signal is induced in the second conductive layer as the beam vibrates in the magnetic field. The shift of the resonant frequency of the beam results in a shift in the frequency of this output signal. The output signal is then analyzed to determine the mass of the deposited material. An array of such multiple oscillating mass balance sensors may be formed on a substrate, such as a silicon semiconductor chip, and a magnetic field affecting all of the sensors on the chip is then provided by a magnet positioned adjacent the chip. Circuits connected to the sensors may each include respective input and output leads. Further, common positive and negative input bus strips may be used to connect rows of the sensors. The second conductive element of each sensor connects to respective positive and negative output leads, enabling the output signals from each of the sensors to be fed to processing circuits. The output signals are evaluated to determine the amount of deposition at each of the multiple locations over the surface of the chip, or such other area of interest on or around which the sensors are mounted. An evaluation of the pattern of deposition throughout the surface of interest may then be made.

The small size of a micromechanical oscillating mass balance affords several distinct advantages over previously existing technologies. In addition to excellent portability and applicability to virtually any environment and location, temperature gradients are substantially minimized by the small physical dimensions (microns) and low mass of the sensor element. This allows efficient control of the temperature of the sensing element. This temperature control can be accomplished easily by mounting the instrument directly on a solid state Peltier device. Such an approach for the temperature control of other mass measuring devices is not feasible due to their generally complicated shapes and relatively large sizes. The small mass of the sensor element of the present invention also makes it able to survive large inertial loads while other measurement systems are relatively fragile.

Another advantage of the present invention is the reduced cost associated with both design simplicity and the low excitation frequency of the active element. Prior devices such as QCMs, which operate in the megahertz range, require more expensive instrumentation than the mass balance of the present invention, which vibrates in the kilohertz range. The vibrational mode of the present invention is also inherently simpler than the relatively complex transverse vibrational mode of prior devices such as QCMs. This is beneficial since it facilitates a relatively straightforward theoretical analysis of the performance of the invention.

In summary, the potential benefits of the proposed invention are low cost, high sensitivity and ruggedness, and low susceptibility to thermal errors relative to previously available microbalances.

BRIEF DESCRIPTION OF THE DRAWINGS

For a more detailed description of the preferred embodiments of the invention, reference will now be made to the accompanying drawings, wherein.

DESCRIPTION OF THE PREFERRED EMBODIMENTS

I. Introduction

The micromechanical oscillating mass balance is an instrument to measure small quantities of material, and having a measurement resolution on the order of 0.01 micrograms ($10^{-8}$ grams). This device is applicable to a wide range of uses involving the mass transfer of minute quantities of material, including the measurement of deposited material upon surfaces in high and ultra high vacuum environments (e.g. physical vapor deposition chambers) and the experimental determination of surface chemical reaction rates.

II. Micromechanical Oscillating Mass Balance Sensor Element

Figure 1:
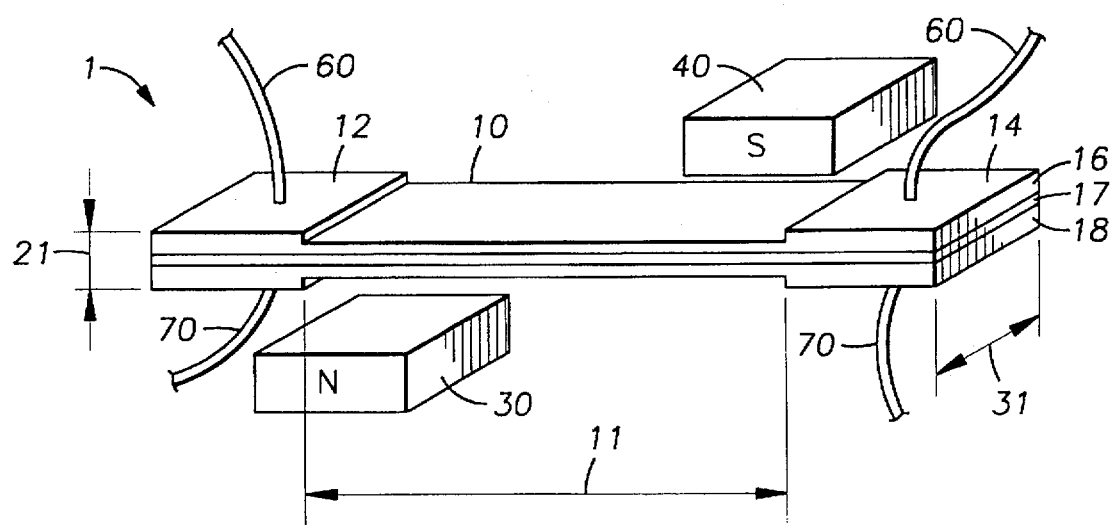
FIG. 1 is a greatly expanded isometric view of a preferred embodiment of the micromechanical oscillating mass balance sensor element in accordance with the present invention.

Referring now to FIG. 1, a preferred embodiment of the sensor element of the present invention is illustrated. The sensor element I comprises a tiny composite beam 10 with both ends 12, 14 rigidly fixed.

The beam 10 is preferably comprised of three layers, namely a dielectric middle layer 17, sandwiched between two conductive layers 16, and 18. An alternating current 20 (hereinafter "AC drive current") is passed through conductive layer 16, and a magnetic field is applied around beam 10 by, for example, a set of permanent magnets 30 and 40 disposed in the vicinity of beam 10. As will be obvious to one skilled in the art, other means of providing such a magnetic field may be employed without departing from the scope of the present invention.

Figure 2:
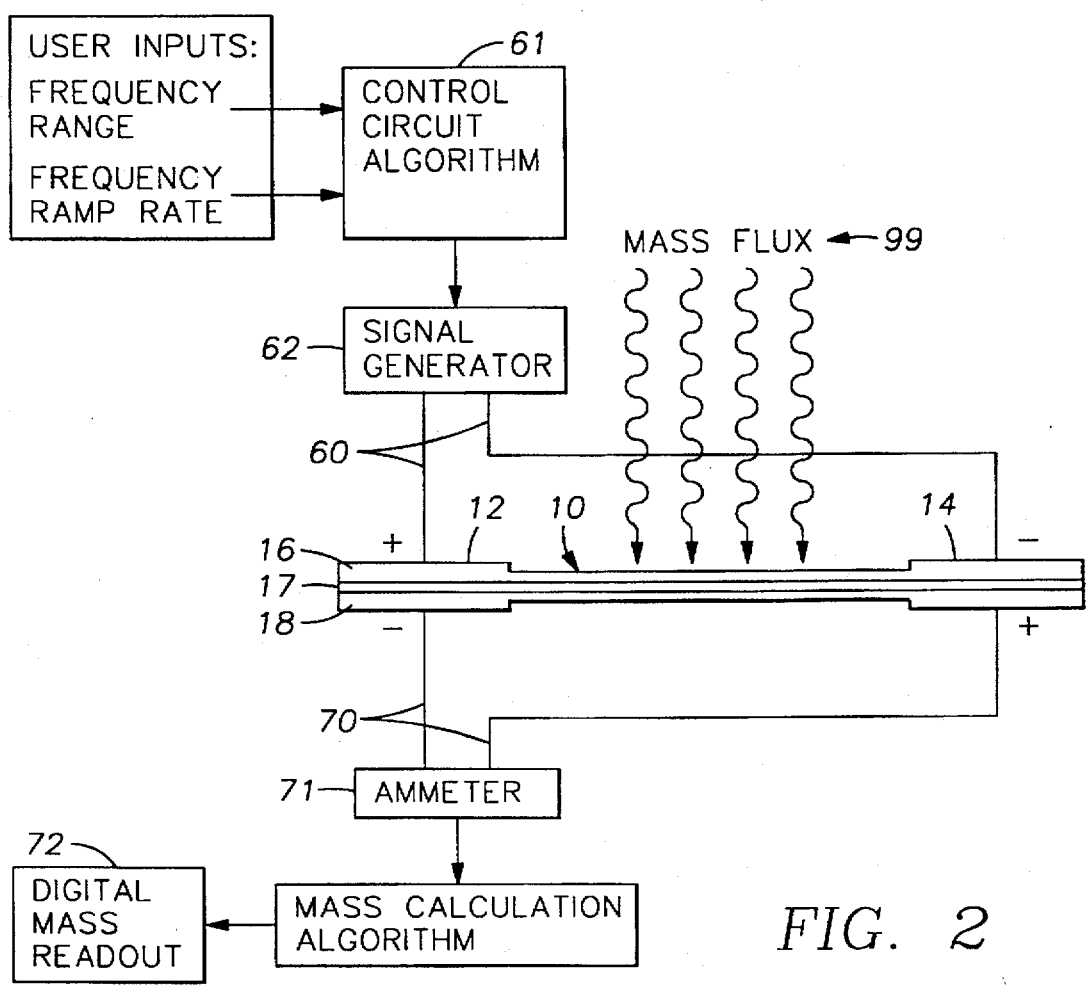
FIG. 2 is a simplified schematic of a micromechanical oscillating mass balance system in accordance with the present invention.

Referring now to FIGS. 1 and 2, AC drive current leads 60 are electrically coupled to the ends 12, 14 of conductive layer 16, to conduct the AC drive current 20 between sensor element 1 and an input circuit. The input circuit preferably includes a control circuit algorithm 61 and signal conditioning circuitry such as signal generator 62, as is well known in the art. Output current leads 70 are similarly attached to the ends 12, 14 of conductive layer 18 to conduct the output current signal 50 between sensor element 1 and an output circuit, which preferably includes signal analysis circuitry such as ammeter 71 and readout 72, also well known in the art.

Figure 3:
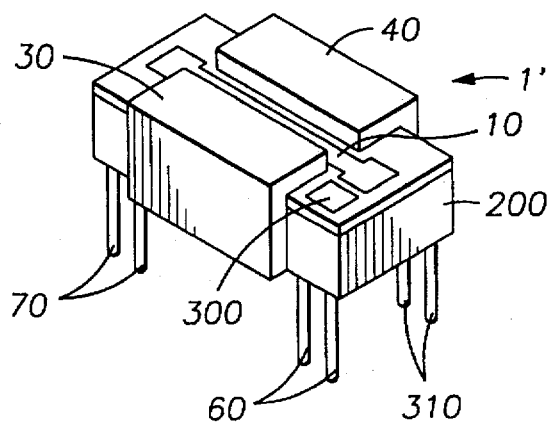
FIG. 3 is a simplified isometric view of a preferred embodiment of the present invention in which the micromechanical oscillating mass balance sensor element is integrated with a semiconductor chip.
Figure 4:
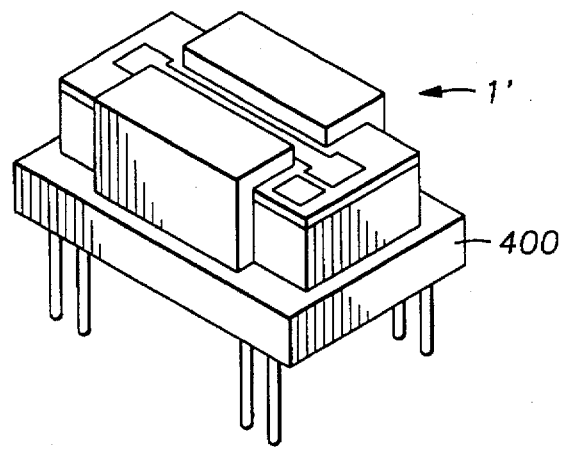
FIG. 4 is a simplified isometric view of another preferred embodiment of the present invention in which the micromechanical oscillating mass balance sensor element is integrated with a semiconductor chip and a Peltier device.

Referring now to FIGS. 3 and 4, other preferred embodiments of the micromechanical oscillating mass balance of the present invention are illustrated. In these embodiments, the sensor element 1' is integrated with a silicon substrate such as chip 200, and permanent field magnets 30, 40. The embodiment illustrated in FIG. 3 also preferably incorporates h temperature sensor 300, and temperature sensor signal connections 310 electrically coupled to temperature sensor 300. Temperature sensor 300 preferably comprises a thermistor, although other temperature sensors may be used without departing from the scope of present invention. The temperature sensor 300 provides an indication of the temperature of the micromechanical oscillating mass balance. This temperature indication is preferably used as an input to a control scheme, which may be a conventional control circuit (not shown), and is thus used by the control circuit to maintain a constant temperature at the sensor element. Referring now to FIG. 4, a constant temperature at the sensor element is obtained by a constant temperature source, preferably a chip carrier with built-in Peltier device 400. The temperature indication rosy also be used to make thermal corrections to the output signal current 50 from the micromechanical oscillating mass balance.

Figure 5:
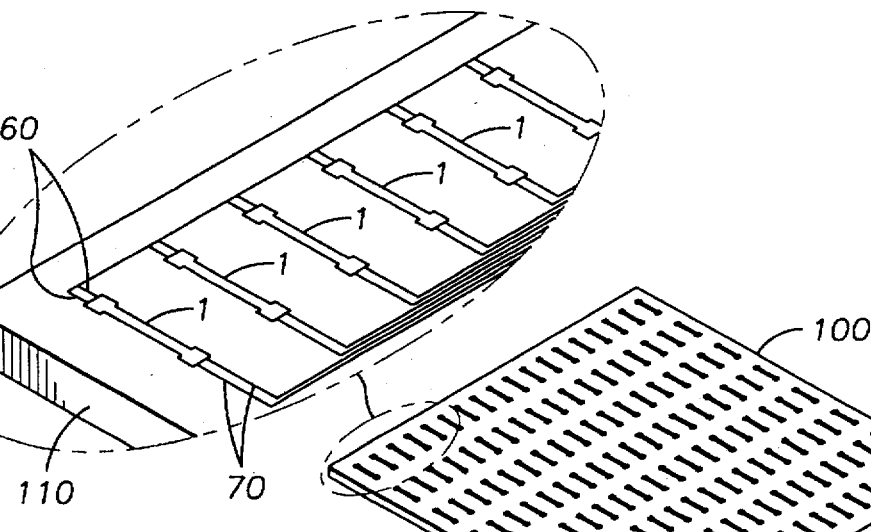
FIG. 5 is a schematic of a micromechanical oscillating mass balance sensor element array, which includes a plurality of sensor elements in accordance with the present invention.
Figure 6:
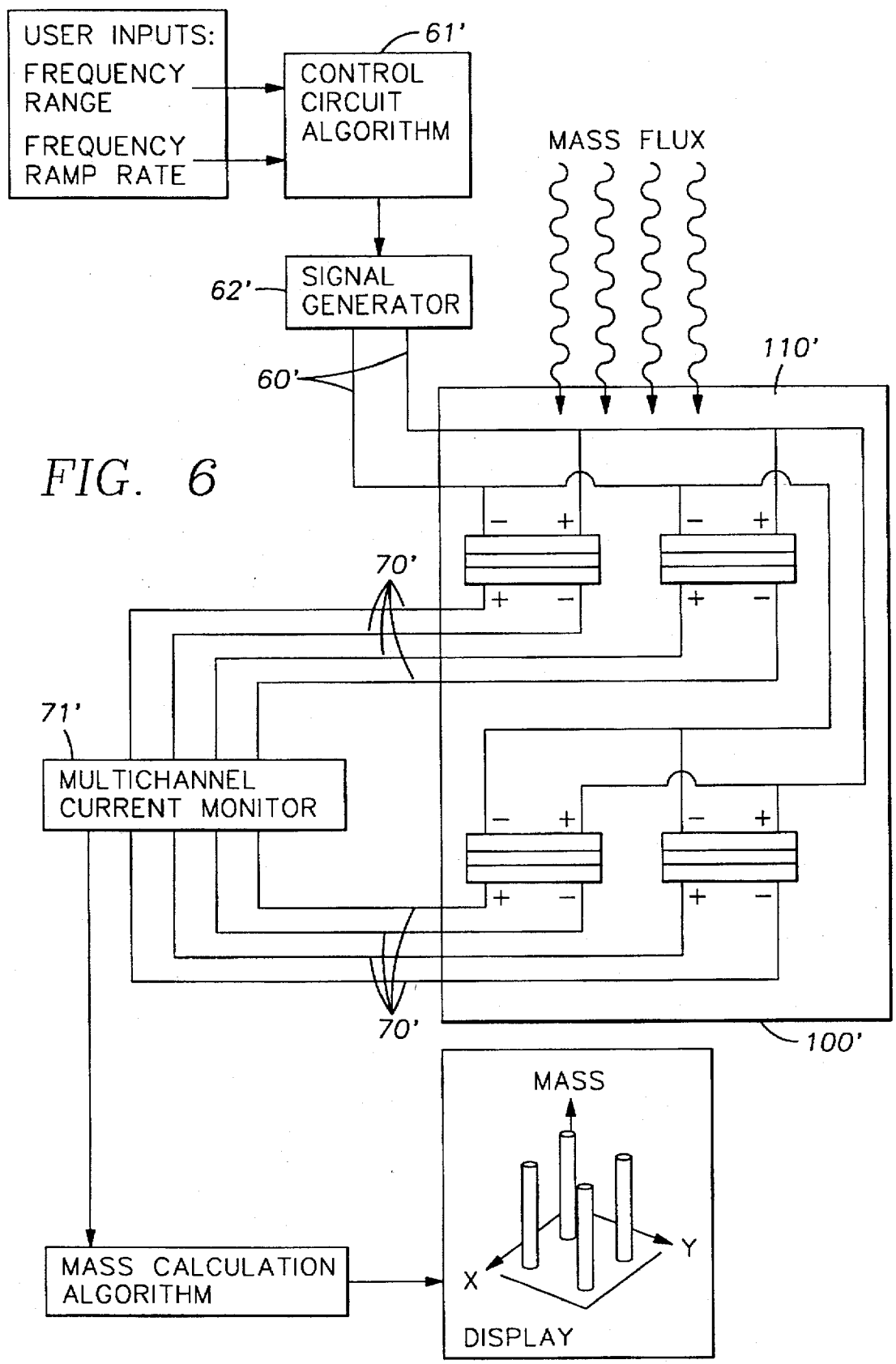
FIG. 6 is a simplified schematic of a micromechanical oscillating mass balance sensor array system in accordance with the present invention.

Referring now to FIGS. 1, 5, and 6, a plurality of sensor elements 1 as shown in FIG. 1 may be utilized in a sensor array 100, as illustrated in FIG. 5. Sensor array 100 may comprise any suitable substrate such as a silicon semiconductor chip 110. In such an embodiment, a magnetic field affecting all of the sensor elements I on chip 110 is provided by a magnet (not shown) positioned adjacent to chip 110. Circuits for the AC drive current 20 and output current signal 50 preferably connect to all sensor elements 1 on sensor array 100 via AC drive current leads 60 and output current signal leads 70, respectively, and common positive and negative bus strips 80 and 90. Common input bus strips 80 preferably are used to connect the first conductive layer 16 of the rows of sensor elements 1 in an array 100 to AC drive current 20. The second conductive layer 18 of each sensor element 1 of a row similarly connects to positive and negative output bus strips 90, via output current signal leads 70. As will be described further, the output signals 50 from each of the sensor elements 1 in array 100 couples to output signal processing circuit(s).

Referring now to FIG. 6, there is shown an exemplary sensor array comprising four sensor elements in a two-by-two sensor array 100' on a common substrate chip 110', and input and output signal processing circuitry as is well known in the art. AC drive current leads 60' conduct the AC drive current 20 between an input circuit and sensor array 100'. The input circuitry for the exemplary embodiment of FIG. 6 includes control circuit algorithm 61' and signal generator 62'. Four pairs of current signal leads 70' are used in this embodiment. The output circuitry includes multichannel current monitor 71'.

In both the embodiment illustrated in FIG. 5 and the embodiment illustrated in FIG. 6, the output signals 50 are evaluated in accordance with the invention described herein to determine the amount of deposition at multiple locations over a surface of interest. Evaluation of the deposition pattern over the surface of army 100 is thus used to determine the mount of deposition over chip 110. Similarly, the deposition pattern over the surface of array 100' allows determination of the amount of deposition over chip 110'.

III. Theory of Operation of Sensor Element

Referring again to FIGS. 1 and 2, the AC drive current 20 interacts with the magnetic field created by magnets 30, 40, and a force is created which serves to deflect beam 10. This force is described, in vector notation, by:

$$\bar{F} = (\bar{i}_d \times \bar{B}) l \qquad (1)$$

where $\bar{i}_d$ is the AC drive current 20, $\bar{B}$ is the magnetic flux density due to magnets 30, 40, and l is the length 11 of beam 10. Since the AC drive current is an alternating signal, the direction of the force $\bar{F}$ also is alternating and, therefore, beam 10 will oscillate with a frequency that can be controlled by adjusting the frequency of AC drive current 20. In this way, conductive layer 16 essentially acts in analogous fashion to a singly wound rotor of an electric motor.

Because the entire beam 10 oscillates, the second conductive layer 18 also moves in the presence of the magnetic field created by magnets 30, 40, which induces an electric output current 50 in conductive layer 18. The amplitude and frequency of output current 50 are preferably used to characterize the oscillation of beam 10. Conductive layer 18 therefore functions in analogous fashion to a singly wound rotor of an AC generator.

When material is deposited on and adheres to beam 10 due to a mass flux 99, the resonant frequency of the beam/material assemblage shifts relative to the resonant frequency of beam 10 alone (in a "clean" state). The resulting output current 50 is then preferably used to correlate the frequency shift to the mass of the material added to beam 10. The output current 50 is proportional to v, the velocity of the oscillating beam/material assemblage, according to the relation $$i_o = \frac{Blv}{R} \quad (2)$$

where R is the resistance of the output current circuit. Since the velocity of the oscillation of the beam/material assemblage is the derivative of the vibrational amplitude of the oscillating assemblage, $$i_o = \frac{Bl}{R} \frac{dx}{dt} \quad (3)$$

where x is the vibrational amplitude of the oscillating beam 10, or the oscillating beam/material assemblage, and dx/dt is the derivative of the vibrational amplitude with respect to time.

Figure 7:
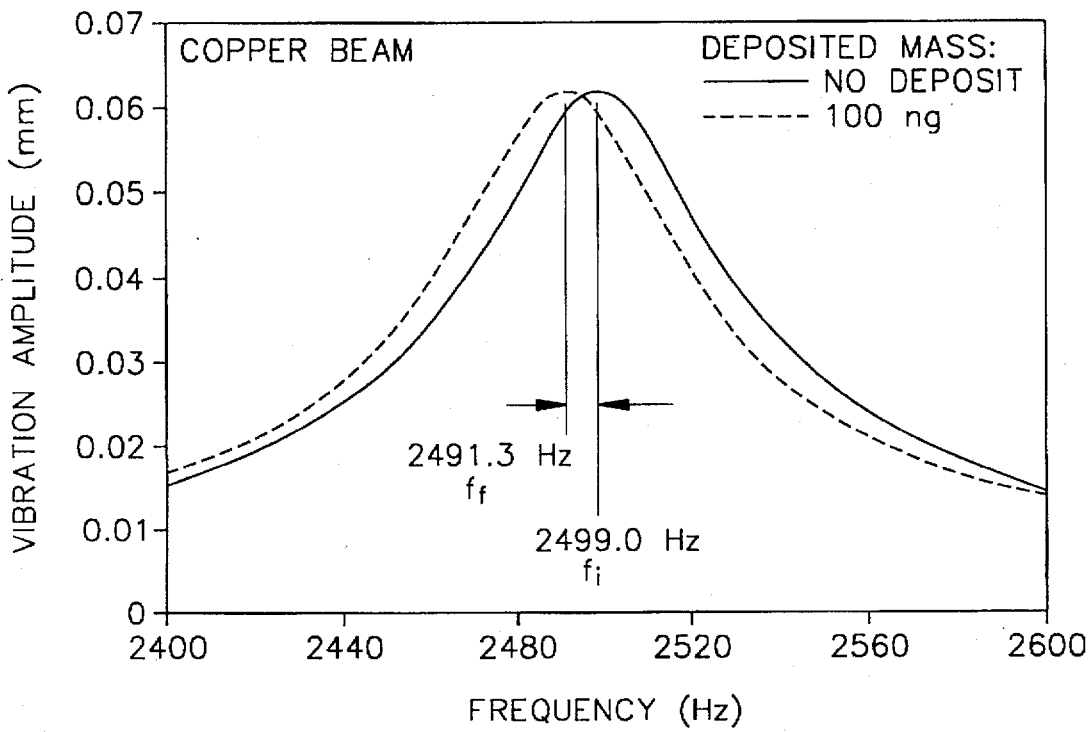
FIG. 7 is a graph of the calculated vibrational amplitude of a composite beam for a preferred embodiment of the micromechanical oscillating mass balance sensor element in accordance with the present invention, plotted over a range of vibrational frequencies.
Figure 8:
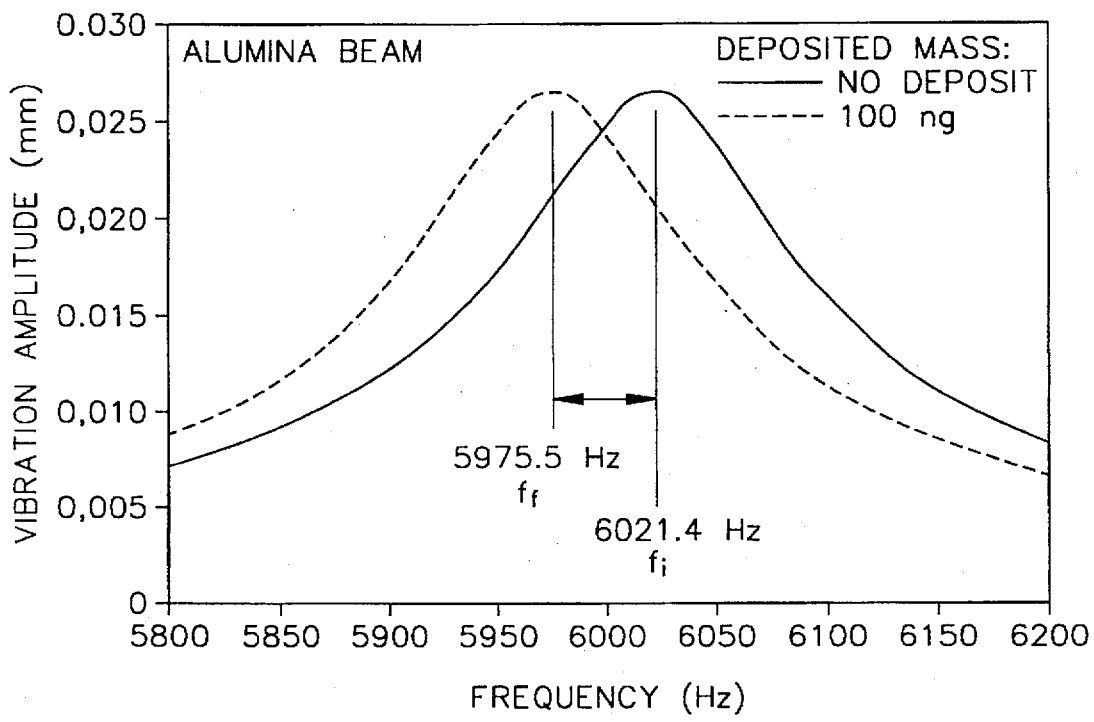
FIG. 8 is a graph of the calculated vibrational amplitude of a composite beam for another preferred embodiment of the micromechanical oscillating mass balance sensor element in accordance with the present invention, plotted over a range of vibrational frequencies.

Referring now to FIGS. 1, 7, and 8, predictions are shown for sensor element vibrational amplitudes based on NASTRAN finite element analyses performed for a beam 10 with a length 11 of 3000 µm, a width 31 of 100 µm, and a thickness 21 of 6 µm. Analyses are shown for sensor element beams comprised of copper and alumina in FIGS. 7 and 8, respectively. The NASTRAN model code used for these analyses is listed in the Appendix. NASTRAN output is summarized by the output curves shown in FIGS. 7, 8 and 9. Since copper and alumina differ significantly in their elastic properties, the results shown represent the upper and lower limits on the vibrational amplitude of any copper/alumina composite beam 10 in accordance with the present invention. Many other compositions of beam 10 will be apparent to one reasonably skilled in the art.

Referring still to FIGS. 7 and 8, two important conclusions are apparent. First, the vibrational amplitude of the sensor element beam 10 increases drastically at the fundamental frequency of beam 10. Thus the output current signal 50 will likewise increase at these characteristic frequencies. Second, a detectable frequency shift occurs when sensor element beam 10 experiences even a very small increase in mass due to, for example, deposition of material. This frequency shift is calculated to be approximately 1 Hz for changes in mass of $10^{-8}$ grams. Shifts of this magnitude are easily detectable by conventional signal analysis equipment well known in the art.

Figure 9:
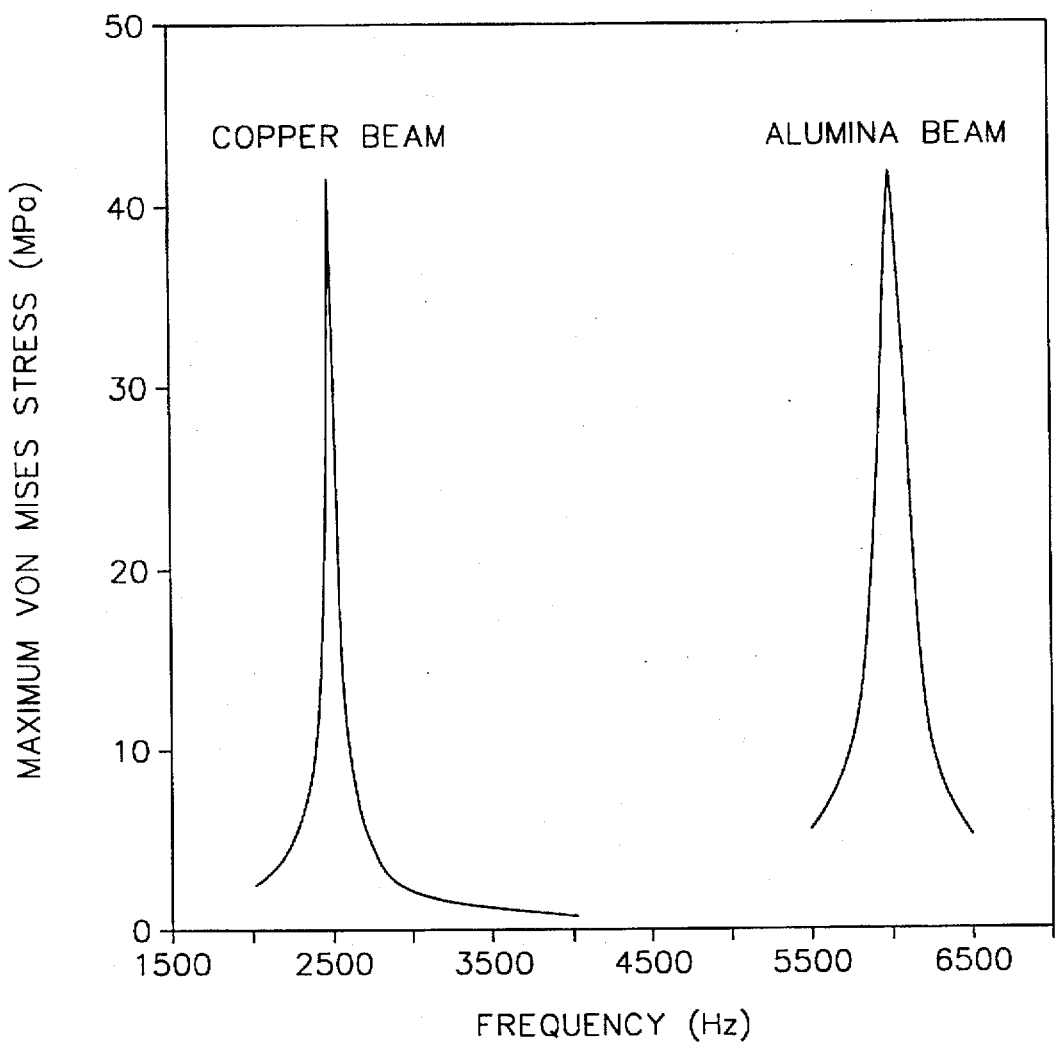
FIG. 9 is a graph of the calculated maximum stress on micromechanical oscillating mass balance sensor element beams constructed of copper and alumina (aluminum dioxide)

An important operational issue of the micromechanical oscillating mass balance of the present invention is the susceptibility of the sensor element to fatigue failure. Referring now to FIG. 9, there are shown the maximum stresses predicted by NASTRAN analyses for the copper and alumina sensor element beams 10 discussed above with reference to FIGS. 7 and 8. The loads for these cases are based on an AC drive current 20 with an amplitude of 1 mA. In the case of a monolithic copper beam, the fatigue strength limits are not exceeded until at least $10^7$ cycles at a beam temperature of 325° C. based on fatigue curves such known in the art. See e.g. A. J. Kennedy, *Processes of Creep and Fatigue in Metals* (1962). Based on an extrapolation of the available data, fatigue should not be a problem near room temperature because the maximum stress level predicted by the finite element analysis is well below the fatigue strength limits. Further, these maximum stresses occur only at the fundamental frequency of the beam 10 and do not occur uniformly throughout the entire frequency range of the sensor element 1. Therefore, a lifetime estimate of $10^7$ cycles is quite conservative since these stresses are experienced during only a small fraction of the operating time of element 1.

Crosstalk between the AC drive current 20 and output current signal 50 is also of concern. However, crosstalk can be alleviated by properly selecting the thickness of the dielectric layer 17. By way of example, alumina ($Al_2O_3$) and silica ($S_iO_2$) layers of proper thickness are both known to satisfy this requirement, and many ceramic materials and polymeric materials should provide acceptable performance. Many other satisfactory materials will be apparent to those skilled in the art.

IV. Fabrication of Sensor Element

The dimensions of sensor element 1 are on the order of microns and, therefore, the fabrication of the device will require use of microscopic manufacturing methods such as are currently practiced in the microelectronics industry. One or more sensor elements 1 may be integrated on the surface of a silicon chip together with supporting electronic circuitry in accordance with the present invention. Although any number of manufacturing sequences may be imagined, by way of example and not limitation, an exemplary proposed fabrication sequence will now be described.

Referring now to FIGS. 10a–10h, the manufacturing sequence preferably begins with a flat non-conductive substrate 100, on which the micromechanical oscillating mass balance is constructed. Substrate 100, in an exemplary embodiment, may be a part of a preassembled silicon chip carrier that has electrical connections already built into it. The substrate is then drilled or machined to form a hole 205 through the substrate. The diameter of hole 205 is chosen to correspond to the desired length of the beam 10 (e.g. reference numeral 11 in FIG. 1). The surface of substrate 200 is then activated by treatment with an atomic beam 220, such as an argon beam, or other non-reactive atomic beam. This treatment modifies the surface of substrate 200 by increasing its surface energy and rendering it an adhesive surface 210.

Figure 10A:
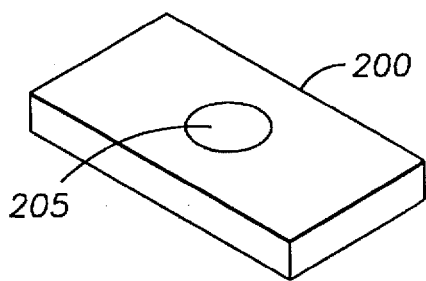
FIGS. 10a–10h are schematic diagrams of a micromechanical oscillating mass balance sensor element in various stages of an exemplary fabrication scheme in accordance with the present invention.
Figure 10E:
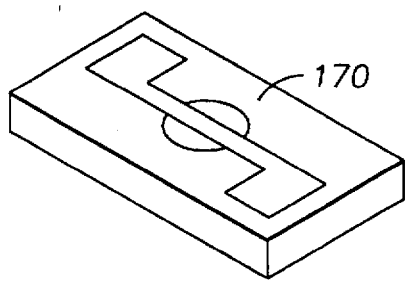
Figure 10B:
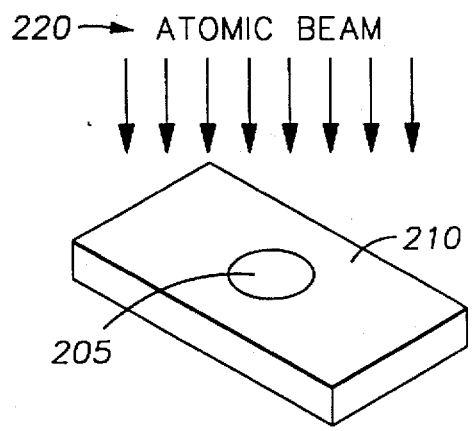
Figure 10F:
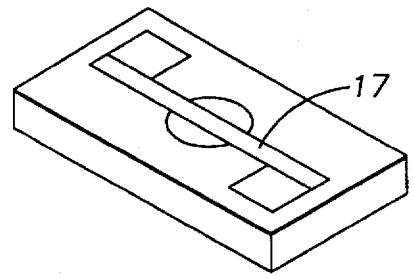
Figure 10C:
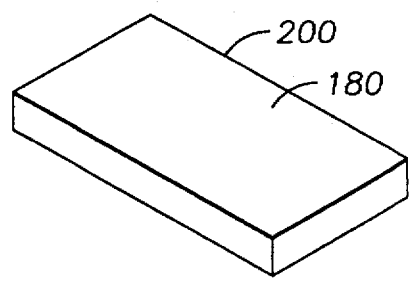

Conductive layer 18 then is created by first applying a conductive metal foil 180 to the adhesive surface 210, as shown in FIG. 10c. The foil 180 adheres to adhesive surface 210 as a result of the aforementioned treatment by atomic beam 220. Although a range of thicknesses for foil 180 is acceptable, a thickness of approximately 3 µm is preferred. The layer of foil 180 is then machined by photolithography, as is known in the art, to remove the foil 180 from part of the surface and leave only the conductive layer 18 of what will become sensor element beam 10 and electrical connections points 181, 182, as shown in FIG. 10d.

The dielectric layer 17 then is created by vapor-depositing a layer 170 of nonconductive oxide, such as silica or alumina, over the substrate (including conductive layer 18), as shown in FIG. 10e. This oxide layer is then partially removed, using photolithographic techniques, from part of the surface so that it remains only on what will become sensor element beam 10. The oxide layer is removed from electrical connection points 181, 182 as a result of this process, as shown in FIG. 10f.

Figure 11:
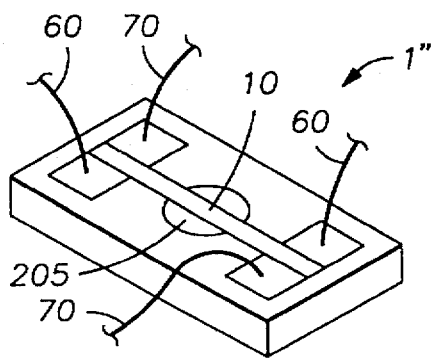
FIG. 11 is a schematic diagram of a micromechanical oscillating mass balance sensor element after fabrication in accordance with an exemplary fabrication scheme of the present invention.
Figure 12:
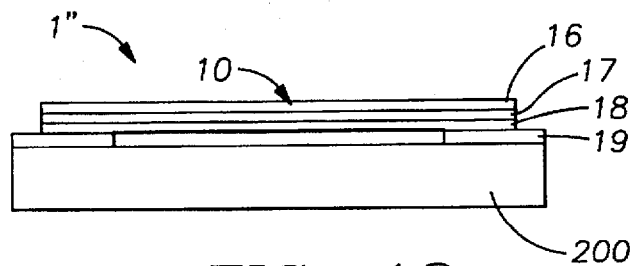
FIG. 12 is a cross section of a micromechanical oscillating mass balance sensor element after fabrication in accordance with an exemplary fabrication scheme of the present invention.
Figure 10G:
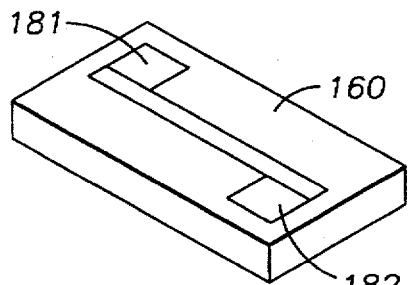
Figure 10D:
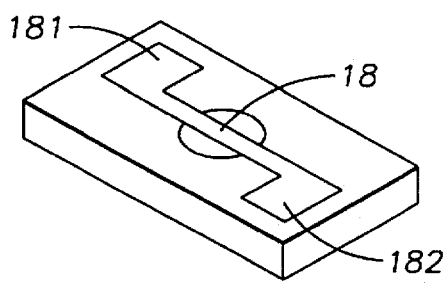
Figure 10H:
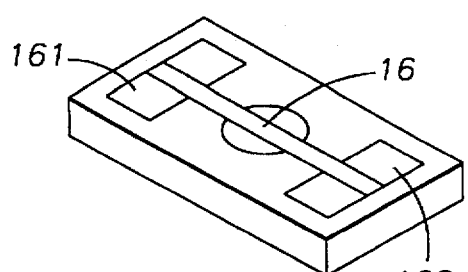

Conductive layer 16 then is created by vapor-depositing a second layer of conductive metal foil 160 over the substrate (including dielectric layer 17), as shown in FIG. 10g. This second layer of foil 160 is then similarly machined via photolithography to leave only the "top" conductive layer 16 of beam 10 and its electrical connection points 161, 162, as shown in FIG. 10h. At this point the element 1" is essentially complete, and leads 60, 70 may be added as shown in FIG. 11. Referring also to FIG. 12, an embodiment of element 1" in accordance with the above-described fabrication scheme is shown in cross-section. In this embodiment, conductive layers 16 and 18 are gold, and dielectric layer 17 is silicon dioxide (silica).

Multiple element arrays such as 100 and 100' described previously with reference to FIGS. 5 and 6, respectively, may of course be fabricated by processing a plurality of substrates 200 simultaneously, or by increasing the size of substrate 200 and fabricating a plurality of sensor elements 1" on the substrate, as is known in conventional semiconductor manufacturing art. Other fabrication sequences may of course be imagined by one skilled in the art without departing from the scope of the present invention.

V. Operation of the Micromechanical Oscillating Mass Balance

The preferred method for obtaining a mass measurement using the micromechanical oscillating mass balance involves the vibration of beam 10 through a predetermined frequency range. Before such a mass measurement can be made, the sensor element 1 must be calibrated. This calibration is accomplished by conducting a frequency sweep of the AC drive current 20 through a predetermined range, which may be chosen to include the expected fundamental frequency (or "resonant frequency") of beam 10. The output current signal 50 is then simultaneously analyzed as discussed herein to determine the fundamental frequency of the beam 10 while it is clean (i.e. devoid of deposited material). The mass m of the clean beam 10 is related to its fundamental frequency f according to:

$$M = k/f^2 \quad (4)$$

where k is a temperature dependent proportionality factor. Since the initial (clean) mass of the beam 10 can be calculated theoretically from a knowledge of its material properties, and the fundamental frequency is measured as discussed above, k can then be determined. This k value is then used to measure any change in mass of beam 10 resulting in a final beam mass $m_f$ due to, for example, deposition of material on beam 10, in terms of a frequency shift according to:

$$\Delta m = m_f - m_i = K \left( \frac{1}{f_f^2} - \frac{1}{f_i^2} \right) \quad (5)$$

where the initial (clean beam) and final (beam plus deposited material) masses are indicated by $m_i$ and $m_f$, respectively, and the initial and final fundamental frequencies are indicated by $f_i$ and $f_f$, respectively. Examples of this frequency shift are illustrated in FIGS. 7 and 8, for copper and alumina beams, respectively.

While preferred embodiments of the invention have been shown and described, modifications thereof can be made by one skilled in the art without departing from the spirit of the invention.

---

NASTRAN Input Deck:
Finite Element Model to Calculate MOMB Frequency Response

```
ASSIGN,OUTPUT2='mass.op2',NEW,UNIT=12,UNFORMATTED
$
ID MICROBALANCE DESIGN
SOL 30
TIME 25
CEND
$
TITLE = Microbalance Design -- UNITS = MODIFIED SI
SUBTITLE = Mechanical Frequency Response
SET 100 = 31
DISPLACEMENT(SORT1,PUNCH,PHASE) = 100
METHOD = 1
DLOAD = 2
```

---

-continued

NASTRAN Input Deck:
Finite Element Model to Calculate MOMB Frequency Response

```
FREQUENCY = 3
SDAMPING = 4
SPC = 1
ECHO = NONE
$
BEGIN BULK
CORD2S  2 0 0.00000 0.00000 0.00000 0.00000 0.00000 1000.00+1A  2
+1A     2 1000.00 0.00000 0.00000
CORD2C  1 0 0.00000 0.00000 0.00000 0.00000 0.00000 1000.00+1A  1
+1A     1 1000.00 0.00000 0.00000
GRID     1 0 -1.50000 0.00000 5.0E-2  0
GRID     2 0 -1.50000 0.00000 -5.0E-2 0
GRID     3 0 -1.40000 0.00000 5.0E-2  0
GRID     4 0 -1.40000 0.00000 -5.0E-2 0
GRID     5 0 -1.30000 0.00000 5.0E-2  0
GRID     6 0 -1.30000 0.00000 -5.0E-2 0
GRID     7 0 -1.20000 0.00000 5.0E-2  0
GRID     8 0 -1.20000 0.00000 -5.0E-2 0
GRID     9 0 -1.10000 0.00000 5.0E-2  0
GRID    10 0 -1.10000 0.00000 -5.0E-2 0
GRID    11 0 -1.00000 0.00000 5.0E-2  0
GRID    12 0 -1.00000 0.00000 -5.0E-2 0
GRID    13 0 -0.90000 0.00000 5.0E-2  0
GRID    14 0 -0.90000 0.00000 -5.0E-2 0
GRID    15 0 -0.80000 0.00000 5.0E-2  0
GRID    16 0 -0.80000 0.00000 -5.0E-2 0
GRID    17 0 -0.70000 0.00000 5.0E-2  0
GRID    18 0 -0.70000 0.00000 -5.0E-2 0
GRID    19 0 -0.60000 0.00000 5.0E-2  0
GRID    20 0 -0.60000 0.00000 -5.0E-2 0
GRID    21 0 -0.50000 0.00000 5.0E-2  0
GRID    22 0 -0.50000 0.00000 -5.0E-2 0
GRID    23 0 -0.40000 0.00000 5.0E-2  0
GRID    24 0 -0.40000 0.00000 -5.0E-2 0
GRID    25 0 -0.30000 0.00000 5.0E-2  0
GRID    26 0 -0.30000 0.00000 -5.0E-2 0
GRID    27 0 -0.20000 0.00000 5.0E-2  0
GRID    28 0 -0.20000 0.00000 -5.0E-2 0
GRID    29 0 -0.10000 0.00000 5.0E-2  0
GRID    30 0 -0.10000 0.00000 -5.0E-2 0
GRID    31 0 3.49E-7 0.00000 5.0E-2   0
GRID    32 0 3.49E-7 0.00000 -5.0E-2  0
GRID    33 0 0.10000 0.00000 5.0E-2   0
GRID    34 0 0.10000 0.00000 -5.0E-2  0
GRID    35 0 0.20000 0.00000 5.0E-2   0
GRID    36 0 0.20000 0.00000 -5.0E-2  0
GRID    37 0 0.30000 0.00000 5.0E-2   0
GRID    38 0 0.30000 0.00000 -5.0E-2  0
GRID    39 0 0.40000 0.00000 5.0E-2   0
GRID    40 0 0.40000 0.00000 -5.0E-2  0
GRID    41 0 0.50000 0.00000 5.0E-2   0
GRID    42 0 0.50000 0.00000 -5.0E-2  0
GRID    43 0 0.60000 0.00000 5.0E-2   0
GRID    44 0 0.60000 0.00000 -5.0E-2  0
GRID    45 0 0.70000 0.00000 5.0E-2   0
GRID    46 0 0.70000 0.00000 -5.0E-2  0
GRID    47 0 0.80000 0.00000 5.0E-2   0
GRID    48 0 0.80000 0.00000 -5.0E-2  0
GRID    49 0 0.90000 0.00000 5.0E-2   0
GRID    50 0 0.90000 0.00000 -5.0E-2  0
GRID    51 0 1.00000 0.00000 5.0E-2   0
GRID    52 0 1.00000 0.00000 -5.0E-2  0
GRID    53 0 1.10000 0.00000 5.0E-2   0
GRID    54 0 1.10000 0.00000 -5.0E-2  0
GRID    55 0 1.20000 0.00000 5.0E-2   0
GRID    56 0 1.20000 0.00000 -5.0E-2  0
GRID    57 0 1.30000 0.00000 5.0E-2   0
GRID    58 0 1.30000 0.00000 -5.0E-2  0
GRID    59 0 1.40000 0.00000 5.0E-2   0
GRID    60 0 1.40000 0.00000 -5.0E-2  0
GRID    61 0 1.50000 0.00000 5.0E-2   0
GRID    62 0 1.50000 0.00000 -5.0E-2  0
CQUAD4   1 1 1  2  4  3 0.00000
CQUAD4   2 1 3  4  6  5 0.00000
CQUAD4   3 1 5  6  8  7 0.00000
CQUAD4   4 1 7  8 10  9 0.00000
CQUAD4   5 1 9 10 12 11 0.00000
```

NASTRAN Input Deck:
Finite Element Model to Calculate MOMB Frequency Response

```
CQUAD4   6   1   11  12  14  13 0.00000
CQUAD4   7   1   13  14  16  15 0.00000
CQUAD4   8   1   15  16  18  17 0.00000
CQUAD4   9   1   17  18  20  19 0.00000
CQUAD4  10   1   19  20  22  21 0.00000
CQUAD4  11   1   21  22  24  23 0.00000
CQUAD4  12   1   23  24  26  25 0.00000
CQUAD4  13   1   25  26  28  27 0.00000
CQUAD4  14   1   27  28  30  29 0.00000
CQUAD4  15   1   29  30  32  31 0.00000
CQUAD4  16   1   31  32  34  33 0.00000
CQUAD4  17   1   33  34  36  35 0.00000
CQUAD4  18   1   35  36  38  37 0.00000
CQUAD4  19   1   37  38  40  39 0.00000
CQUAD4  20   1   39  40  42  41 0.00000
CQUAD4  21   1   41  42  44  43 0.00000
CQUAD4  22   1   43  44  46  45 0.00000
CQUAD4  23   1   45  46  48  47 0.00000
CQUAD4  24   1   47  48  50  49 0.00000
CQUAD4  25   1   49  50  52  51 0.00000
CQUAD4  26   1   51  52  54  53 0.00000
CQUAD4  27   1   53  54  56  55 0.00000
CQUAD4  28   1   55  56  58  57 0.00000
CQUAD4  29   1   57  58  60  59 0.00000
CQUAD4  30   1   59  60  62  61 0.00000
MAT1    1   117.2E+6   0.34000  8.94E-6
$MAT1   1   275.8E+6   0.25000  3.6E-6
PSHELL  1   1  0.006   1        1    3.33E-10
SPC1    1   123456   1THRU    2
SPC1    1   123456   61THRU   62
EIGR    1   GIV                2
RLOAD2  2   101                102
FREQ1   3   0.0   1.0   6500
TABDMP1 4   CRIT                        +XX
+XX   0.0  0.01   6500.0   0.01   ENDT
DAREA   101   3   2-6.19E-5
DAREA   101   4   2-6.19E-5
DAREA   101   5   2-6.19E-5
DAREA   101   6   2-6.19E-5
DAREA   101   7   2-6.19E-5
DAREA   101   8   2-6.19E-5
DAREA   101   9   2-6.19E-5
DAREA   101   10  2-6.19E-5
DAREA   101   11  2-6.19E-5
DAREA   101   12  2-6.19E-5
DAREA   101   13  2-6.19E-5
DAREA   101   14  2-6.19E-5
DAREA   101   15  2-6.19F-5
DAREA   101   16  2-6.19E-5
DAREA   101   17  2-6.19E-5
DAREA   101   18  2-6.19E-5
DAREA   101   19  2-6.19E-5
DAREA   101   20  2-6.19E-5
DAREA   101   21  2-6.19E-5
DAREA   101   22  2-6.19E-5
DAREA   101   23  2-6.19E-5
DAREA   101   24  2-6.19E-5
DAREA   101   25  2-6.19E-5
DAREA   101   26  2-6.19E-5
DAREA   101   27  2-6.19E-5
DAREA   101   28  2-6.19E-5
DAREA   101   29  2-6.19E-5
DAREA   101   30  2-6.19E-5
DAREA   101   31  2-6.19E-5
DAREA   101   32  2-6.19E-5
DAREA   101   33  2-6.19E-5
DAREA   101   34  2-6.19E-5
DAREA   101   35  2-6.19E-5
DAREA   101   36  2-6.19E-5
DAREA   101   37  2-6.19E-5
DAREA   101   38  2-6.19E-5
DAREA   101   39  2-6.19E-5
DAREA   101   40  2-6.19E-5
DAREA   101   41  2-6.19E-5
DAREA   101   42  2-6.19E-5
DAREA   101   43  2-6.19E-5
DAREA   101   44  2-6.19E-5
DAREA   101   45  2-6.19E-5
DAREA   101   46  2-6.19E-5
DAREA   101   47  2-6.19E-5
DAREA   101   48  2-6.19E-5
DAREA   101   49  2-6.19E-5
DAREA   101   50  2-6.19E-5
DAREA   101   51  2-6.19E-5
DAREA   101   52  2-6.19E-5
DAREA   101   53  2-6.19E-5
DAREA   101   54  2-6.19E-5
DAREA   101   55  2-6.19E-5
DARFA   101   56  2-6.19E-5
DAREA   101   57  2-6.19E-5
DAREA   101   58  2-6.19E-5
DAREA   101   59  2-6.19E-5
DAREA   101   60  2-6.19E-5
GRAV    1   9.81E+3   0.0   1.0   0.0
TABLED1 102                            +TAB1
TAB1    0.0   1.0   6500.0   1.0   ENDT
PARAM   AUTOSPC   YES
PARAM   PRGPST    No
PARAM   POST      -2
ENDDATA
```

I claim:

1. A micromechanical oscillating mass balance, comprising:
   a sensing element, which includes:
      a first conducting layer;
      a second conducting layer;
      a dielectric layer disposed between the first and second conducting layers;
   an electrical source for providing an alternating current through the first conducting layer for oscillating the sensing element;
   a magnetic field disposed in the vicinity of the sensing element to induce an electric current in the second conducting layer when the sensing element is oscillated.

2. The micromechanical oscillating mass balance of claim 1, wherein the magnetic field is provided by a permanent magnet.

3. The micromechanical oscillating mass balance of claim 2, further comprising a chip carrier mechanically coupled to the sensing element.

4. The micromechanical oscillating mass balance of claim 3, wherein the chip carrier substantially comprises silicon.

5. The micromechanical oscillating mass balance of claim 3, further comprising a solid state Peltier device for controlling the temperature of the sensing element.

6. The micromechanical oscillating mass balance of claim 5, further comprising an output electrical circuit electrically coupled to the second conductive layer for measuring the frequency and amplitude of the electrical current induced in the second conducting layer.

7. The micromechanical oscillating mass balance of claim 6, further comprising a function generator for controlling the amplitude and frequency of the electrical source.

8. The micromechanical oscillating mass balance of claim 7, wherein the first and second conducting layers substantially comprise metal foil.

9. The micromechanical oscillating mass balance of claim 8, wherein the metal foil substantially comprises metallic gold.

10. The micromechanical oscillating mass balance of claim 8, wherein the metal foil substantially comprises metallic copper.

11. The micromechanical oscillating mass balance of claim 9, wherein the dielectric layer substantially comprises $SiO_2$.

12. The micromechanical oscillating mass balance of claim 9, wherein the dielectric layer substantially comprises $Al_2O_3$.

13. The micromechanical oscillating mass balance of claim 10, wherein the dielectric layer substantially comprises $SiO_2$.

14. The micromechanical oscillating mass balance of claim 10, wherein the dielectric layer substantially comprises $Al_2O_3$.

15. The micromechanical oscillating mass balance of claim 8, wherein the dielectric layer substantially comprises a polymeric material.

16. The micromechanical oscillating mass balance of claim 8, wherein the dielectric layer substantially comprises a ceramic material.

17. Apparatus for continuously measuring a mass deposited on a sensing element, comprising:
    a vibratory composite beam upon which the mass is deposited, said vibratory composite beam comprising a dielectric layer sandwiched between a first and a second conducting layer;
    a magnetic field in which the vibratory composite beam is positioned;
    an alternating current passing through the first of the conducting layers and causing the vibratory composite beam to oscillate, thereby inducing a correspondingly oscillating electric current in the second conducting layer.

18. The apparatus of claim 17, further comprising an output electrical circuit electrically coupled to the second conducting layer for measuring the amplitude and frequency of the oscillating electrical current induced in the second conducting layer.

19. The apparatus of claim 18, wherein the alternating current passing through the first conductive layer has a variable amplitude and a variable frequency.

20. The apparatus of claim 19, wherein the magnetic field is generated by a permanent magnet disposed in the vicinity of the vibratory composite beam.

21. The apparatus of claim 20, wherein the dielectric layer substantially comprises silicon dioxide.

22. The apparatus of claim 19, wherein the dielectric layer substantially comprises aluminum dioxide.

23. The apparatus of claim 19, wherein at least one of the conducting layers substantially comprises copper metal.

24. The apparatus of claim 19, wherein at least one of the conducting layers substantially comprises gold metal.

25. A method of measuring mass, comprising the steps of:
    (a) calibrating a sensing element, by:
        (1) causing a sensing element to oscillate in a magnetic field through a predetermined frequency range;
        (2) inducing an oscillating electrical current in the sensing element, wherein oscillations of said electrical current correspond to the oscillations of the sensing element;
        (3) measuring the frequency of the induced electrical oscillations;
        (4) determining a first resonant frequency, corresponding to the resonant frequency of the sensing element, from the induced electrical oscillations;
    (b) adding mass to at least one surface of the sensing element;
    (c) causing the sensing element to oscillate in the magnetic field through a second predetermined frequency range;
    (d) inducing an oscillating electrical current in the sensing element, wherein oscillations of said electrical current correspond to oscillations of the sensing element with added mass;
    (e) measuring the frequency of the induced electrical oscillations;
    (f) determining a second resonant frequency, corresponding to the resonant frequency of the sensing element with added mass, from the induced electrical oscillations;
    (g) calculating the quantity of added mass from the difference between the first resonant frequency and the second resonant frequency.

26. The method of claim 25, further comprising the step of:
    (a)(5) calculating a clean mass of the sensing element.

27. The method of claim 26, further comprising the step off
    (a)(6) calculating a calibration factor from the first resonant frequency and clean mass of the sensing element.

28. The method of claim 26, wherein step (e) further comprises measuring the amplitude of the induced electrical oscillations.

29. A method of measuring the change in mass of an oscillatory composite beam, in the presence of a magnetic field, with a resolution of approximately 0.01 micrograms, wherein the oscillatory composite beam includes two conductive members separated by a dielectric member, comprising the steps of:
    determining an initial mass ($m_i$) of the oscillatory composite beam;
    oscillating the oscillatory composite beam through a predetermined frequency range by providing an alternating current through one of the conductive members such that a correspondingly oscillating current is induced in the other of the conductive members;
    identifying an initial fundamental frequency ($f_i$) associated with the initial mass of the oscillatory composite beam by measuring the amplitude and frequency of the oscillating current induced in the other of the conductive members;
    calculating a calibration factor (k);
    adding mass to the oscillatory composite beam;
    identifying a final fundamental frequency ($f_f$) associated with a final mass of the oscillatory composite beam by measuring the amplitude and frequency of the oscillating current induced in the other of the conductive members;
    calculating the mass added ($\Delta m$) to the oscillatory composite beam as a function of the initial mass, the initial fundamental frequency, the final fundamental frequency, and the calibration factor.

30. The method of claim 29 in which the initial mass ($m_i$) is determined from the density and physical characteristics of the oscillatory composite beam.

31. The method of claim 30 in which the calibration factor (k) is calculated from the initial fundamental frequency ($f_i$), and initial mass ($m_i$), by the relation $k = m_i f_i^2$.

32. The method of claim 31 in which the mass added ($\Delta m$) is calculated from the initial fundamental frequency ($f_i$), the final fundamental frequency ($f_f$), and the calibration factor (k), by the relation $$\Delta m = K \left( \frac{1}{f_f^2} - \frac{1}{f_i^2} \right). \tag{6}$$

* * * * *